United States Patent
Akiyama et al.

(10) Patent No.: US 10,556,457 B2
(45) Date of Patent: Feb. 11, 2020

(54) THERMAL TRANSFER SHEET

(71) Applicant: Dai Nippon Printing Co., Ltd., Tokyo (JP)

(72) Inventors: Yusaku Akiyama, Tokyo (JP); Kazuki Enokida, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/750,551

(22) PCT Filed: Mar. 30, 2017

(86) PCT No.: PCT/JP2017/013309
§ 371 (c)(1),
(2) Date: Feb. 6, 2018

(87) PCT Pub. No.: WO2017/170891
PCT Pub. Date: Oct. 5, 2017

(65) Prior Publication Data
US 2018/0272780 A1    Sep. 27, 2018

(30) Foreign Application Priority Data
Mar. 31, 2016    (JP) ................... 2016-072154

(51) Int. Cl.
*B41M 3/12*    (2006.01)
*B44C 1/17*    (2006.01)
(Continued)

(52) U.S. Cl.
CPC ................. *B41M 3/12* (2013.01); *B32B 7/06* (2013.01); *B32B 27/08* (2013.01); *B41M 5/382* (2013.01);
(Continued)

(58) Field of Classification Search
CPC .... B41M 5/382; B41M 5/38264; B41M 5/44; B41M 7/00; B41M 7/0027; B41M 2205/40
(Continued)

(56) References Cited

U.S. PATENT DOCUMENTS 6,673,744 B1 *   1/2004   Taguchi ............. B41M 5/38257
                                                                                                            503/227
7,638,462 B2    12/2009   Kawamura et al.
(Continued)

FOREIGN PATENT DOCUMENTS

CN          1953875 A      4/2007
CN      103079832 A      5/2013
(Continued)

OTHER PUBLICATIONS

English translation of International Preliminary Report on Patentability (Chapter I) (Application No. PCT/JP2017/013309) dated Oct. 11, 2018, 7 pages.
(Continued)

*Primary Examiner* — Gerard Higgins
(74) *Attorney, Agent, or Firm* — Burr & Brown, PLLC

(57) ABSTRACT

The present invention provides a thermal transfer sheet including at least a transfer layer and a substrate. The transfer layer includes at least a protective layer adapted to be peelable from the substrate, and the transfer layer has a peel force in a non-heated state of 1 N/m or more and a peel force in a heated state of 10 N/m or less. The thermal transfer sheet exhibits a high level of adhesion therebetween, even when used in a compact printer that causes the thermal transfer sheet to be heated by the heat of a thermal head. The transfer layer exhibits a high level of releasability when being transferred.

2 Claims, 2 Drawing Sheets

(51) Int. Cl.
*B41M 7/00* (2006.01)
*B41M 5/382* (2006.01)
*B32B 7/06* (2019.01)
*B32B 27/08* (2006.01)

(52) U.S. Cl.
CPC ......... *B41M 7/0027* (2013.01); *B44C 1/1712* (2013.01); *B44C 1/1725* (2013.01); *B32B 2307/30* (2013.01); *B32B 2307/748* (2013.01); *B32B 2405/00* (2013.01); *B41M 2205/10* (2013.01)

(58) Field of Classification Search
USPC .......................................... 428/32.86, 32.87
See application file for complete search history.

(56) References Cited

U.S. PATENT DOCUMENTS

| | | |
|---|---|---|
| 9,597,911 B2 | 3/2017 | Yoda et al. |
| 2003/0003278 A1 | 1/2003 | Narita et al. |
| 2009/0068456 A1 | 3/2009 | Masuda et al. |
| 2014/0212604 A1 | 7/2014 | Suzuki et al. |

FOREIGN PATENT DOCUMENTS

| | | |
|---|---|---|
| EP | 1 129 862 A1 | 9/2001 |
| EP | 1 595 712 A1 | 11/2005 |
| EP | 2 033 803 A1 | 3/2009 |
| JP | 2003-025736 A1 | 1/2003 |
| JP | 2003-154798 A1 | 5/2003 |
| JP | 2005-104106 A | 4/2005 |
| JP | 2006-095982 A1 | 4/2006 |
| JP | 2009-083137 A1 | 4/2009 |
| JP | 2013-082210 A1 | 5/2013 |
| WO | 2015/129721 A1 | 9/2015 |

OTHER PUBLICATIONS

International Search Report and Written Opinion (Application No. PCT/JP2017/013309) dated May 30, 2017.
Extended European Search Report, European Application No. 17775425.6, dated Feb. 12, 2019 (7 pages).
Chinese Office Action (with English translation), Chinese Application No. 201780003210.8, dated Feb. 2, 2019 (12 pages).
Chinese Office Action (Application No. 201780003210.8) dated Sep. 4, 2019 (with English translation).

\* cited by examiner

THERMAL TRANSFER SHEET

BACKGROUND OF THE INVENTION

Field of the Invention

The present invention relates to a thermal transfer sheet. More specifically, the present invention relates to a thermal transfer sheet including a substrate, and a protective layer peelably provided on the substrate.

Background Art

A technique of forming a protective layer on an image has been used as a means for enhancing the durability of printed matters, in which technique, a transfer sheet including a thermally transferable protective layer is used, and the thermally transferable protective layer is transferred by way of a heating means such as a thermal head or a heating roll, onto an image formed by a thermal transfer method, to form a protective layer on the image. The formation of such a protective layer on a printed image allows for improving the wear resistance, chemical resistance or the like of the image. Further, the incorporation of an UV absorber or the like into a protective layer for the purpose of improving the light resistance of the resulting image, or the incorporation of a fluorescent dye or the like into a protective layer for the purpose of imparting a forgery-preventing function, has also been performed.

In a thermal transfer sheet including a protective layer as described above, the protective layer needs to be swiftly and reliably transferred onto an image and to be adhered thereon, when heated from the side of a substrate by a heating means. Too low an adhesive force between the substrate and the protective layer may cause an occurrence of a so-called "foil fall", a phenomenon in which the protective layer is peeled off from the substrate even without the application of heat.

To solve the above mentioned problem, JP 2003-154798 A (Patent Document 1) discloses a transfer sheet including a protective layer whose releasability is adjusted within an appropriate range. The transfer sheet proposed in Patent Document 1 includes: a substrate sheet; and a release layer composed of an acrylic melamine resin and the protective layer composed of a reaction product of a polyol compound and a linear isocyanate compound, formed on the substrate.

PRIOR ART DOCUMENTS

Patent Documents

Patent Document: 1 JP 2003-154798 A

SUMMARY OF THE INVENTION

Problems to be Solved by the Invention

Improvements in thermal transfer printers have been accelerated in recent years. The printing speed tends to be increasingly higher and the energy to be applied during the thermal transfer is becoming higher than that in conventional printers. Accordingly, thermal transfer sheets are required to include a protective layer which is peelable even when a high amount of energy is applied thereto, and an increase in the releasability of the protective layer is demanded. Further, in addition to the trend for a faster printing speed, recent printers are becoming increasingly more compact. As a result, transport paths of a thermal transfer sheet and a printing paper inside a printer tend to be denser and more complicated.

The present inventors have found out that, when a conventional thermal transfer sheet is used in a thermal transfer printer as described above, there are cases where the foil fall of the protective layer may occur even before the start of printing (namely, before the application of energy). The reasons for this have been found out to be as follows. As a result of an increased printing speed and a higher integration in such a printer, the temperature within a printer housing may sometimes rise close to 40° C. due to the residual heat of a printer head, and in addition, there are cases where the thermal transfer sheet before the printing may come into contact with a printing paper; these facts have been found to cause defective peeling of the protective layer.

The present invention has been made in view of the above described situation, and an object of the present invention is to provide a thermal transfer sheet in which the occurrence of the foil fall of a protective layer can be prevented, wherein a transfer layer and a substrate included in the thermal transfer sheet exhibit a high level of adhesion therebetween when not being transferred, even if used in a compact printer, and wherein the transfer layer exhibits a high level of releasability when being transferred.

Means for Solving the Problems

The thermal transfer sheet according to the present invention is characterized by including at least a substrate and a transfer layer: the transfer layer including at least a protective layer provided so as to be peelable from the substrate; the transfer layer having a peel force in a non-heated state of 1 N/m or more; and the transfer layer having a peel force in a heated state of 10 N/m or less.

In the above described embodiment, the protective layer preferably contains a (meth)acrylic resin having a glass transition temperature (Tg) of 60° C. or lower and a vinyl chloride-vinyl acetate copolymer.

In the above described embodiment, a content ratio ((meth)acrylic resin/vinyl chloride-vinyl acetate copolymer) of the (meth)acrylic resin having a glass transition temperature (Tg) of 60° C. or lower to the vinyl chloride-vinyl acetate copolymer in the protective layer is preferably 3/7 or more and 7/3 or less, on mass basis.

Effect of the Invention

In the thermal transfer sheet according to the present invention, the occurrence of foil fall can be prevented, since the transfer layer and the substrate have a high level of adhesion therebetween, even if used in a compact printer that causes the thermal transfer sheet to be heated when not being transferred. Further, in the thermal transfer sheet according to the present invention, the transfer layer is capable of exhibiting a high level of releasability when being transferred.

DETAILED DESCRIPTION OF THE INVENTION

In the present specification, the terms "part(s)", "%", "ratio" and the like used to describe the composition are represented on mass basis, unless otherwise specified.
<Thermal Transfer Sheet>

Figure 1:
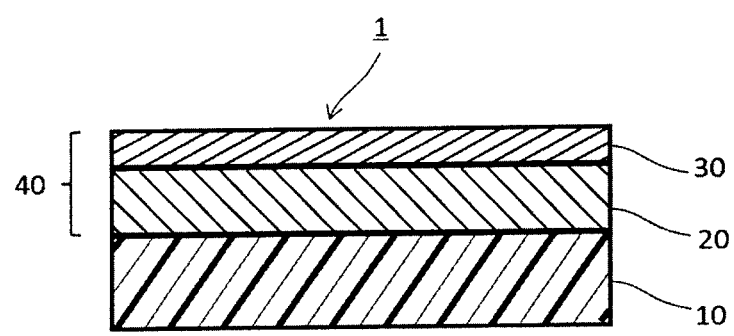
FIG. 1 is a schematic sectional view showing a thermal transfer sheet according to one embodiment of the present invention.
Figure 2:
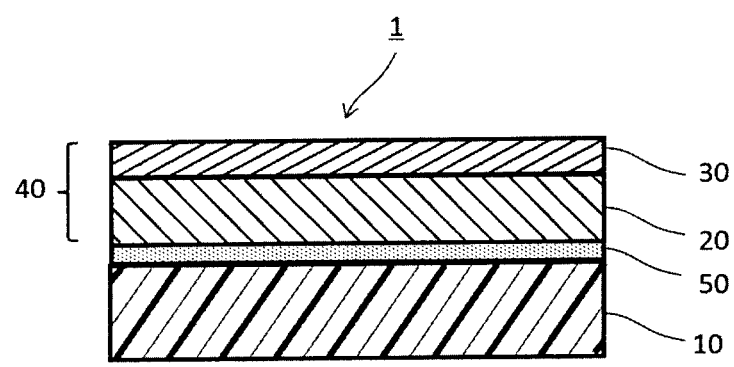
FIG. 2 is a schematic sectional view showing a thermal transfer sheet according to one embodiment of the present invention.
Figure 3:
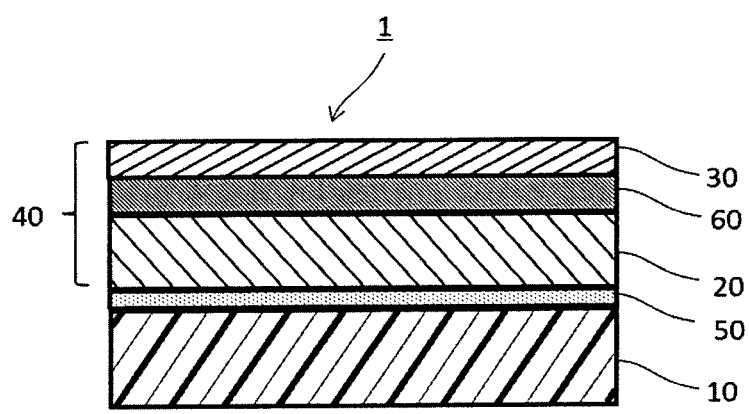
FIG. 3 is a schematic sectional view showing a thermal transfer sheet according to one embodiment of the present invention.

The embodiments of the present invention will now be described in detail, with reference to the drawings. FIG. 1 to FIG. 3 each shows a schematic sectional view of a thermal transfer sheet according to one embodiment of the present invention.

In one embodiment, a thermal transfer sheet 1 according to the present invention includes at least: a substrate 10; a protective layer 20 peelably provided on the substrate 10; and an adhesive layer 30; in the order mentioned (see FIG. 1).

When the thermal transfer sheet 1 as described above is used to transfer a transfer layer 40 onto a transfer receiving material (not shown), the protective layer 20 and the adhesive layer 30 are transferred, as the transfer layer 40, onto the transfer receiving material.

In another embodiment, the thermal transfer sheet 1 may include a release layer 50 between the protective layer 20 and the substrate 10, so that the protective layer 20 can be easily peeled off from the substrate 10 to facilitate the transfer of the transfer layer 40 onto a transfer receiving material (see FIG. 2). Further, the thermal transfer sheet 1 may include a primer layer 60 between the protective layer 20 and the adhesive layer 30 (see FIG. 3). As will be described later, the configuration of the adhesive layer 30 can be adjusted so that the adhesive layer serves as a receiving layer.

In still another embodiment, the thermal transfer sheet 1 may include a back layer, on the surface thereof opposite from the surface provided with the protective layer 20 and the like (not shown). Further, a thermal transfer sheet 1 may include a receiving layer (not shown). Each of the layers constituting the thermal transfer sheet according to the present invention will be described below.
<Substrate>

The substrate is not particularly limited, and any material can be used as long as the material has heat resistance capable of withstanding the thermal energy (for example, heat of a thermal head) applied to the substrate when transferring the transfer layer from the thermal transfer sheet onto a transfer receiving material, as well as mechanical strength and solvent resistance capable of supporting the transfer layer. Examples of the material include polyester resins such as polyethylene terephthalate, polybutylene terephthalate, polyethylene naphthalate, polyethylene terephthalate-isophthalate copolymers, terephthalic acid-cyclohexanedimethanol-ethylene glycol copolymers and coextruded films of polyethylene terephthalate/polyethylene naphthalate; polyamide resins; polyolefin resins such as polyethylene, polypropylene and polymethylpentene; vinyl resins such as polyvinyl chloride; (meth)acrylic resins such as polyacrylate, polymethacrylate and polymethyl methacrylate; imide resins such as polyimide and polyetherimide; engineering resins such as polysulfone, polyether sulfone, polyphenylene ether, polyphenylene sulfide (PPS), polyaramide, polyether ketone, polyether nitrile, polyether ether ketone and polyether sulfite; polycarbonate resins; styrene resins such as polystyrene, high impact polystyrene, acrylonitrile-styrene copolymers (AS resins) and acrylonitrile-butadiene-styrene copolymers (ABS resins); as well as cellulose films such as cellophane, films of cellulose acetate and nitrocellulose.

The substrate may be made of a copolymer resin or a mixed product (including an alloy) containing any of the above described resins as major components, or may be a laminate composed of a plurality of layers. Further, the substrate may be a stretched film or an unstretched film. However, it is preferred that a uniaxially or biaxially stretched film be used in order to impart an improved strength. The substrate is used in the form of a film, a sheet or a board composed of at least one layer made of any of these resins. Among the substrates composed of the above mentioned resins, films made of polyester resins such as polyethylene terephthalate and polyethylene naphthalate are suitably used because of their excellent heat resistance and mechanical strength. In particular, a polyethylene terephthalate film is more preferred.

If necessary, it is possible to form irregularities on the surface of the substrate in order to prevent blocking. Examples of means for forming irregularities on the substrate include incorporation of a matting agent by kneading, sandblasting, hair-line processing, mat coating and chemical etching. The incorporation of a matting agent by kneading is a processing method for forming a substrate by using a resin in which an inorganic or organic is kneaded. The mat coating is a processing method for forming irregularities on the surface by coating a coating agent comprising an inorganic or organic on a substrate.

The substrate may include a release layer on the surface thereof, as will be described later. Therefore, the surface of the substrate to be provided with the release layer may be subjected, in advance, to a treatment for facilitating adhesion, such as, for example, a corona discharge treatment, a plasma treatment, an ozone treatment, a frame treatment, a primer (also referred to as an anchor coat, adhesion promoter or adhesion facilitator) coating treatment, a preheating treatment, a dust removal treatment, a vapor-deposition treatment, an alkali treatment, or formation of antistatic layer. Further, the substrate may contain any of additives such as fillers, plasticizers, colorants and antistatic agents.

The substrate preferably has a thickness of 1 μm or more and 100 μm or less, and more preferably 2 μm or more and 10 μm or less.

When the substrate has a thickness within the above described numerical range, it is possible to improve the transfer of thermal energy when transferring the transfer layer from the thermal transfer sheet, while maintaining the mechanical strength of the substrate.
<Transfer Layer>

In the present invention, the "transfer layer" refers to a layer to be transferred from the thermal transfer sheet onto a transfer receiving material. The transfer layer includes at least a protective layer. Further, in cases where the thermal transfer sheet includes the protective layer and an adhesive layer on the substrate, as shown in FIG. 1, the transfer layer includes the protective layer and the adhesive layer. In cases where the thermal transfer sheet includes the protective layer, a primer layer and the adhesive layer on the substrate, as shown in FIG. 3, the transfer layer includes the protective layer, the primer layer and the adhesive layer.

The transfer layer has a peel force in a non-heated state of 1 N/m or more, more preferably 3 N/m or more and 100 N/m or less, and still more preferably 6 N/m or more and 50 N/m or less.

In the present invention, the term "peel force in a non-heated state" refers to a 180° peel force of the transfer layer at 40° C.

The "180° peel force" refers to a value measured in accordance with JIS-Z-0237. The 180° peel force can be measured, for example, using a tensile tester (trade name: HEIDON-14DR; manufactured by Shinto Scientific Co., Ltd.) (at a tensile speed of 1,000 mm/min) under an atmosphere of 50% relative humidity.

When the transfer layer has a peel force in a non-heated state of 1 N/m or more, it is possible to prevent the occurrence of foil fall, even when the thermal transfer sheet is used in a compact printer in which the interior of the housing is heated to a high temperature due to the residual heat of the thermal head.

Further, the transfer layer has a peel force in a heated state of 10 N/m or less, more preferably 0.01 N/m or more and 7 N/m or less, and still more preferably 0.05 N/m or more and 3 N/m or less.

In the present invention, the term "peel force in a heated state" refers to a tensile strength measured as follows. In the measurement, a printer is used which includes: a thermal transfer sheet supplying means; a heating means; a thermal transfer sheet winding means; a measuring means located between the heating means and the thermal transfer sheet winding means and configured to measure the tensile strength of a thermal transfer sheet transported along the transport path; and a peeling means located between the heating means and the measuring means. The thermal transfer sheet according to the present invention and a transfer receiving material are layered one on another, and while transferring the transfer layer onto the transfer receiving material under the conditions of a printing power of 0.15 W/dot, a transport speed of the thermal transfer sheet of 84.6 mm/sec and peeling angle 50°, the transfer layer which has been transferred onto the transfer receiving material is peeled off from the substrate; the tensile strength measured by the measuring means at this time is defined as the "peel force in a heated state".

When the transfer layer has a peel force in a heated state of 10 N/m or less, the transfer layer can be easily and favorably transferred from the thermal transfer sheet onto a transfer receiving material, even when used in a high-speed printer or the like in which a high thermal energy is applied.

(Protective Layer)

The thermal transfer sheet according to the present invention includes a protective layer as a component layer of the transfer layer. The protective layer is a layer to be located at the outermost surface in the resulting printed matter.

Examples of resins which can be contained in the protective layer include: (meth)acrylic resins; vinyl resins such as vinyl chloride-vinyl acetate copolymer, polyvinyl chloride resins, polyvinyl alcohol resins, polyvinyl butyral resins, polyvinyl acetal resins and polyvinyl pyrrolidone resins; polyester resins such as polyethylene terephthalate resins and polyethylene naphthalate resins; urethane resins such as polyurethane acrylate resins; cellulose resins such as ethyl cellulose resins, hydroxyethyl cellulose resins, ethyl hydroxy cellulose resins, methyl cellulose resins and cellulose acetate resins; polystyrene resins; polyamide resins such as polyamide resins, aromatic polyamide resins and polyamideimide resins; acetal resins; polycarbonate resins; and actinic radiation-curable resins.

In the present invention, the term "actinic radiation-curable resin" refers to a precursor or a composition before being exposed to irradiation of actinic radiation. The actinic radiation-curable resin which has been cured by being exposed to irradiation of actinic radiation is referred to as an "actinic radiation-cured resin". Further, in the present invention, "actinic radiation" refers to a radioactive ray which chemically acts on an actinic radiation-curable resin to facilitate polymerization, and specific examples thereof include visible rays, UV light, X-rays, electron beams, alpha-rays, beta-rays and gamma-rays.

The actinic radiation-curable resin is not particularly limited and any radical polymerizable compound capable of being polymerized by actinic radiation can be used. Examples of the actinic radiation-curable resin which can be used include monomers, oligomers and prepolymers containing radical polymerizable unsaturated groups such as acrylate, vinyl, allyl and isopropenyl groups.

As such compounds, urethane acrylate, epoxy acrylate, polyester acrylate, polyether acrylate, polyethylene acrylate, silicone acrylate, polyol acrylate and the like can be preferably used. Examples of acrylate-based actinic radiation-curable compounds as described above include:

monofunctional acrylic acid esters such as 2-ethylhexyl acrylate, 2-hydroxypropyl acrylate, glycerol acrylate, tetrahydrofurfuryl acrylate, phenoxyethyl acrylate, nonylphenoxyethyl acrylate, tetrahydrofurfuryloxyethyl acrylate, tetrahydrofurfuryloxyhexanolide acrylate, acrylate of ε-caprolactone adduct of 1,3-dioxane alcohol, and 1,3-dioxolane acrylate; and methacrylic acid esters, itaconic acid esters, crotonic acid esters and maleic acid esters obtained by replacing the acrylate in each of the above described compounds with methacrylate, itaconate, crotonate and maleate, respectively;

bifunctional acrylic acid esters such as, ethylene glycol diacrylate, triethylene glycol diacrylate, pentaerythritol diacrylate, hydroquinone diacrylate, resorcin diacrylate, hexandiol diacrylate, neopentyl glycol diacrylate, tripropylene glycol diacrylate, diacrylate of hydroxypivalate neopentyl glycol, diacrylate of neopentyl glycol adipate, diacrylate of ε-caprolactone addut of hydroxypivalate neopentyl glycol, 2-(2-hydroxy-1,1-dimethylethyl)-5-hydroxymethyl-5-ethyl-1,3-dioxane diacrylate, tricyclodecanedimethylol acrylate, ε-caprolactone adduct of tricyclodecanedimethylol acrylate, and diacrylate of diglycidyl ether of 1,6-hexanediol; and methacrylic acid esters, itaconic acid esters, crotonic acid esters and maleic acid esters obtained by replacing the acrylate in each of the above described compounds with methacrylate, itaconate, crotonate and maleate, respectively;

multifunctional acrylic acid esters such as trimethyloipropane triacrylate, ditrimethylolpropanete tetraacrylate, trimethylolethane triacrylate, pentaerythritol triacrylate, pentaerythritol tetraacrylate, dipentaerythritol tetraacrylate, dipentaerythritol pentaacrylate, dipentaerythritol hexaacrylate, ε-caprolactone adduct of dipentaerythritol hexaacrylate, pyrogallol triacrylate, propionic acid/dipentaerythritol triacrylate, propionic acid/dipentaerythritol tetraacrylate, and hydroxypivalyl aldehyde-modified dimethylolpropane triacrylate; and methacrylic acid esters, itaconic acid esters, crotonic acid esters and maleic acid esters obtained by replacing the acrylate in each of the above described compounds with methacrylate, itaconate, crotonate and maleate, respectively;

phosphazene monomers; triethylene glycol; isocyanuric acid ethylene oxide-modified diacrylate; isocyanuric acid ethylene oxide-modified triacrylate; dimethylol tricyclodecane diacrylate; trimethylolpropane acrylic acid benzoate; alkylene glycol-type acrylic acid-modified acrylate; and urethane-modified diacrylate.

The protective layer preferably contains a (meth)acrylic resin, particularly, a (meth)acrylic resin having a glass transition temperature (Tg) of 60° C. or lower, and a vinyl chloride-vinyl acetate copolymer. Incorporation of these resins allows for a further improvement in the peel force in a non-heated state, as well as a further reduction in the peel force in a heated state.

The content of the (meth)acrylic resin having a glass transition temperature (Tg) of 60° C. or lower in the protective layer is preferably 30% by mass or more and 70% by mass or less, and more preferably 40% by mass or more and 60% by mass or less.

In the present invention, the glass transition temperature (Tg) can be obtained by differential scanning calorimetry, in accordance with JIS-K-7121.

Further, the content of the vinyl chloride-vinyl acetate copolymer in the protective layer is preferably 30% by mass or more and 70% by mass or less, and more preferably 40% by mass or more and 60% by mass or less.

The content ratio ((meth)acrylic resin/vinyl chloride-vinyl acetate copolymer) of the (meth)acrylic resin having a glass transition temperature (Tg) of 60° C. or lower to the vinyl chloride-vinyl acetate copolymer in the protective layer is preferably 3/7 or more and 7/3 or less, and more preferably 4/6 or more and 6/4 or less, on mass basis. When the content ratio of the (meth)acrylic resin having a glass transition temperature (Tg) of 60° C. or lower to the vinyl chloride-vinyl acetate copolymer is within the above described numerical range, it is possible to further improve the peel force in a non-heated state as well as to further reduce the peel force in a heated state.

The glass transition temperature (Tg) of the (meth)acrylic resin is more preferably 25° C. or higher and 80° C. or lower, and still more preferably 40° C. or higher and 60° C. or lower. When the glass transition temperature (Tg) of the (meth)acrylic resin is within the above described numerical range, the peel force in a heated state can further be reduced.

The above described (meth)acrylic resin preferably has a weight average molecular weight of 3,000 or more and 8,000 or less, and more preferably 4,000 or more and 7,000 or less.

In the present invention, the term "weight average molecular weight (Mw)" refers to a value measured by gel permeation chromatography using polystyrene as a standard material, and it can be measured by a method in accordance with JIS-K-7252-1.

In the present invention, the term "(meth)acrylic" is used to encompass both "acrylic" and "methacrylic" species. Further, the term "(meth)acrylic resin" includes (1) polymers of acrylic acid or methacrylic acid monomers, and derivatives thereof, (2) polymers of acrylate or methacrylate monomers, and derivatives thereof, (3) copolymers of acrylic acid or methacrylic acid monomers and any other monomers, and derivatives thereof, and (4) copolymers of acrylate or methacrylate monomers and any other monomers, and derivatives thereof.

Examples of acrylate and methacrylate monomers include alkyl acrylate, alkyl methacrylate, methyl acrylate, methyl methacrylate, ethyl acrylate, ethyl methacrylate, butyl acrylate, butyl methacrylate, lauryl acrylate and lauryl methacrylate.

Examples of other monomers include aromatic hydrocarbons, aryl group-containing compounds, amide group-containing compounds and vinyl chloride. More specific examples thereof include styrene, benzylstyrene, phenoxyethyl methacrylate, acrylamide and methacrylamide.

Examples of the (meth)acrylic resin include poly(meth)acrylate, polymethyl (meth)acrylate, poly(meth)acrylamide and styrene acrylic copolymers. Among these, polymethyl (meth)acrylate is particularly preferred, for the purpose of further securing the heat resistance, abrasion resistance and transparency.

The vinyl chloride-vinyl acetate copolymer contained in the protective layer preferably has a number average molecular weight (Mn) of 5,000 or more and 100,000 or less, and more preferably 10,000 or more and 50,000 or less. When the vinyl chloride-vinyl acetate copolymer has a weight average molecular weight within the above described numerical range, the adhesion between the protective layer and the substrate can be improved. In the present invention, the term "number average molecular weight (Mn)" refers to a value measured by gel permeation chromatography using polystyrene as a standard material, and it can be measured by a method in accordance with JIS-K-7252-1.

Further, the vinyl chloride-vinyl acetate copolymer preferably has a glass transition temperature (Tg) of 20° C. or higher and 100° C. or lower, and more preferably 50° C. or higher and 80° C. or lower. When the glass transition temperature (Tg) of the vinyl chloride-vinyl acetate copolymer is within the above described numerical range, the heat resistance of the protective layer can be improved.

In the present invention, the term "vinyl chloride-vinyl acetate copolymer" includes (1) copolymers of vinyl chloride and vinyl acetate, and derivatives thereof, and (2) copolymers of vinyl chloride and vinyl acetate and any other monomers.

Examples of other monomers, as in the case of the (meth)acrylic resin, include aromatic hydrocarbons, aryl group-containing compounds, amide group-containing compounds and vinyl chloride. More specific examples thereof include styrene, benzylstyrene, phenoxyethyl methacrylate, acrylamide and methacrylamide.

Further, the protective layer can contain a filler. Examples of the filler include organic fillers, inorganic fillers and organic-inorganic hybrid fillers. The filler may be in the form of a powder or a sol. Among the above described fillers, inorganic particles are preferred, because they have a high hardness and thus allow for an improvement in scratch resistance.

The filler to be contained in the protective layer preferably has a volume average particle diameter of 10 nm or more and 3,000 nm or less, and more preferably 10 nm or more and 500 nm or less. When the filler has a volume average particle diameter within the above described numerical range, the scratch resistance of the protective layer can be improved while maintaining the transparency.

In the present invention, the volume average particle diameter can be measured using a particle size/particle diameter distribution measuring apparatus (such as Nanotrac particle size distribution measuring apparatus, manufactured by Nikkiso Co., Ltd., and the like), in accordance with JIS-Z-8819-2.

Examples of the inorganic particles include metal oxide particles such as silica particles (for example, colloidal silica, fumed silica, precipitated silica and the like), alumina particles, zirconia particles, titania particles and zinc oxide particles. Of these, silica particles are preferably used in terms of improving the wear resistance. Further, the inorganic particles are preferably those surface treated with a silane coupling agent such as γ-aminopropyltriethoxysilane or γ-methacryloxypropyltrimethoxysilane, or the like.

The above described filler is preferably contained in an amount of preferably 5% by mass or more and 60% by mass or less, and more preferably 10% by mass or more and 50% by mass or less, with respect to the total solid content of the protective layer. When the content of the filler in the protective layer is within the above described numerical range, it is possible to improve the transferability of the resulting thermal transfer sheet, and the wear resistance of a printed matter obtained using the thermal transfer sheet, as well as to prevent the protective layer from being fragile, thereby preventing the occurrence of defects such as cracks.

The protective layer can contain any of additives, such as plasticizers, UV light stabilizers, coloration inhibitors, matting agents, deodorants, flame retardants, weather resistant agents, antistatic agents, yarn friction reducing agents, slip agents, release agents, antioxidants, ion exchangers and coloring pigments, to the extent that the properties of the protective layer are not impaired.

The protective layer preferably has a thickness of 0.1 μm or more and 2 μm or less, and more preferably 0.4 μm or more and 1.5 μm or less. When the protective layer has a thickness within the above described numerical range, it is possible to impart a high durability while preventing defective transfer.

The protective layer can be formed by dispersing or dissolving the (meth)acrylic resin and the like as described above in water or an appropriate solvent, and coating the resulting dispersion or solution on the substrate or the release layer to be described later, by a known means such as roll coating, reverse roll coating, gravure coating, reverse gravure coating, bar coating, rod coating or the like to form a coated film, followed by drying or irradiation of actinic radiation.

The irradiation of actinic radiation, for example, irradiation of UV light can be carried out using a conventionally known UV irradiation apparatus, and it is possible to use any of various types of light sources without limitation, such as, for example, high pressure mercury lamps, low pressure mercury lamps, carbon arc lamps, xenon arc lamps, metal halide lamps, electrodeless UV lamps and LEDs. For the irradiation of an electron beam, it is possible to use either a high energy-type electron beam irradiation apparatus which irradiates an electron beam at an energy of 100 keV or more and 300 keV or less, or a low energy-type electron beam irradiation apparatus which irradiates an electron beam at an energy of 100 keV or less. Further, the irradiation apparatus may be one employing either a scanning type or curtain type irradiation system.

(Adhesive Layer)

Next, a description will be given below regarding an adhesive layer, which is optionally included in the thermal transfer sheet according to the present invention, as a component layer of the transfer layer.

The adhesive layer is optionally provided so as to be positioned at the surface of the thermal transfer sheet, and is a layer for improving the adhesion of the transfer layer to a transfer receiving material.

The adhesive layer may be a layer which functions as a receiving layer, in which an image is formed due to thermal transfer from a thermal transfer sheet including a color material layer. The portion of the thermal transfer sheet where the image has been formed is then transferred onto a transfer receiving material, as a result of which, a printed matter is formed.

Examples of materials for forming the adhesive layer include thermal adhesion type adhesives, which melt or soften due to heat and exhibit adhesive properties. Specific examples thereof include ionomer resins, acid-modified polyolefin resins, ethylene-(meth)acrylic acid copolymers, ethylene-(meth)acrylate copolymers, polyester resins, polyamide resins, vinyl resins, (meth)acrylic resins, acrylate resins, maleic acid resins, butyral resins, alkyd resins, polyethylene oxide resins, phenolic resins, urea resins, melamine resins, cellulose resins, polyurethane resins, polyvinyl ether resins, silicone resins and rubber resins. These resins are used singly, or a plurality of these resins are used in combination. Among these, vinyl resins, acrylic resins, butyral resins, polyester resins are preferred in terms of adhesive force and the like. More preferred are vinyl resins, acrylic resins, ethylene-(meth)ethyl acrylate copolymers and acrylate copolymers.

In cases where it is intended that the adhesive layer function as a receiving layer, it is preferable to use a conventionally known resin which easily accepts a thermally transferable coloring material, such as a sublimation dye or a heat-meltable ink. Examples of the resin as described above include: polyolefin resins such as polypropylene; vinyl resins such as vinyl chloride-vinyl acetate copolymer, polyvinyl chloride resins, polyvinyl alcohol resins, polyvinyl butyral resins, polyvinyl acetal resins and polyvinyl pyrrolidone resins; polyester resins such as polyethylene terephthalate and polybutylene terephthalate; polystyrene resins; polyamide resins; copolymer resins of olefins such as ethylene and propylene with other vinyl polymers; cellulose resins; and polycarbonate resins.

The content of the above described resin in the adhesive layer is preferably 30% by mass or more and 100% by mass or less, and more preferably 50% by mass or more and 100% by mass or less, with respect to the total solid content of the adhesive layer. When the content of the resin in the adhesive layer is within the above described numerical range, it is possible to improve the transferability of the transfer layer onto a transfer receiving material, as well as to improve the acceptability of the adhesive layer for a thermally transferable coloring material such as a sublimation dye or a heat-meltable ink.

Further, the adhesive layer preferably contains a silicone. In the present invention, the term "silicone" includes modified silicone resins and modified silicone oils. Examples of the modified silicone resins include epoxy-modified silicone resins, monoamine-modified silicone resins, diamine-modified silicone resins and mercapto-modified silicone resins. Examples of the modified silicone oils include epoxy-modified silicone oils, monoamine-modified silicone oils, diamine-modified silicone oils and mercapto-modified silicone oils. When the adhesive layer contains a silicone, it is possible to improve the releasability of the transfer layer from the thermal transfer sheet including a color material layer which is used when forming an image on the adhesive layer.

The content of the silicone in the adhesive layer is preferably 0.1% by mass or more and 10% by mass or less, and more preferably 0.5% by mass or more and 5% by mass or less, with respect to the total solid content of the adhesive layer.

The adhesive layer preferably has a thickness of 0.1 μm or more and 10 μm or less, and more preferably 0.3 μm or more and 3 μm or less.

The adhesive layer can be formed by mixing a single or a plurality of materials selected from those described above and any of various types of additives and the like, as necessary; dissolving or dispersing the resulting mixture in water or an appropriate solvent such as an organic solvent to prepare a coating liquid for forming an adhesive layer; and coating the resulting coating liquid by a means such as gravure printing, screen printing, or reverse coating using a gravure plate, followed by drying.

(Primer Layer)

The transfer layer included in the thermal transfer sheet according to the present invention may optionally include a primer layer between the protective layer and the adhesive layer. The primer layer is a layer capable of improving the adhesion between the protective layer and the adhesive layer.

The primer layer can contain a polyester resin, a polyurethane resin, a polycarbonate resin, a (meth)acrylic resin, a polystyrene resin, a vinyl resin, a cellulose resin and/or the like.

In cases where the primer layer contains a resin containing an active hydroxyl group, the primer layer preferably contains an isocyanate compound.

The isocyanate compound is preferably a polyisocyanate compound containing two or more isocyanate groups within its molecule. Examples of the polyisocyanate compound include xylene diisocyanate, paraphenylene diisocyanate, 1-chloro-2,4-phenyl diisocyanate, 2-chloro-1,4-phenyl diisocyanate, 2,4-toluene diisocyanate, 2,6-toluene diisocyanate, 1,5-naphthalene diisocyanate, tolidine diisocyanate, p-phenylene diisocyanate, trans-cyclohexane, 1,4-diisocyanate, hexamethylene diisocyanate, 4,4'-biphenylene diisocyanate, triphenylmethane triisocyanate and 4,4',4"-trimethyl-3,3',2'-triisocyanate-2,4,6-triphenyl cyanurate.

The primer layer preferably has a thickness of 0.05 μm or more and 3 μm or less, and more preferably 0.5 μm or more and 1.5 μm or less.

The primer layer can be formed by dispersing or dissolving any of the above described resins and the like in water or a solvent, and coating the resulting dispersion or solution by a known coating method such as roll coating, gravure coating or the like, followed by drying.

<Release Layer>

The thermal transfer sheet according to the present invention may optionally include a release layer. The release layer is a layer provided on the substrate, so as to allow the transfer layer, which includes the protective layer and the adhesive layer and the like and which is formed on the release layer, to peel off from the thermal transfer sheet and to be transferred onto a transfer receiving material. By varying the configuration of this layer, it is possible to adjust the peel force in a non-heated state and the peel force in a heated state of the transfer layer. When the transfer layer is peeled off from the thermal transfer sheet, the release layer remains on the side of the substrate.

The release layer can include a release agent. Examples of the release agent include melamine resin-based release agents, silicone-based release agents, fluorine resin-based release agents, cellulose resin-based release agents, urea resin-based release agents, polyolefin resin-based release agents, paraffin-based release agents, (meth)acrylic resin-based release agents and waxes. The release layer may contain one, or two or more types of the above described release agents.

The release layer preferably has a thickness of 0.1 μm or more and 5 μm or less, and more preferably 0.5 μm or more and 2 μm or less, in terms of the stability of the peel force.

The release layer can be prepared by dispersing or dissolving any of the above described release agents in water or a solvent, and coating the resulting dispersion or solution by a known coating method such as roll coating, gravure coating or the like, followed by heat drying or aging at a temperature of about 30° C. or higher and 200° C. or lower.

<Back Layer>

The thermal transfer sheet according to the present invention may optionally include a back layer. The back layer is a layer provided for the purpose of preventing adverse effects, such as sticking and wrinkles, which may occur due to being heated from the back surface of the substrate (on the side not provided with the protective layer and the like) during the thermal transfer. By providing the back layer, it becomes possible, even in the case of using a thermal transfer sheet which includes as the substrate a plastic film having poor heat resistance, to perform thermal printing without the occurrence of sticking, and to make use of the advantages of plastic films, such as resistance to rupture, ease of processing, and the like.

The back layer can contain an acrylic resin, a vinyl resin, a polyester resin, a polyurethane resin, a cellulose resin, a polyamide resin, an acetal resin, a polycarbonate resin and/or the like.

Further, the back layer can contain a wax, a higher fatty acid amide, a metal soap, a silicone oil, a surfactant and/or the like, for the purpose of improving the slip properties.

The back layer preferably has a thickness of 0.1 μm or more and 5 μm or less, and more preferably 0.4 μm or more and 2 μm or less, in terms of improving the heat resistance.

The back layer can be formed by dispersing or dissolving any of the above described resins and slip agents in water or a solvent, and coating the resulting dispersant or solution using a known coating method such as roll coating, gravure coating or the like, followed by drying.

<Transfer of Transfer Layer>

When transferring the transfer layer onto a transfer receiving material using the thermal transfer sheet according to the present invention, the transfer may be carried out by a known transfer method. For example, it is possible to use a known method such as hot stamping (foil stamping) using thermal marking, a full surface or stripe transfer using a hot roll, and the use of a thermal printer (also referred to as a thermal transfer printer) including a thermal head (thermal printing head). The transfer is preferably carried out by hot stamping.

The transfer receiving material is not particularly limited when it is used in applications which require durability, such as wear resistance and solvent resistance. Examples of the transfer receiving material include fiber paper, coated paper, tracing paper, plastic films which are not deformed upon exposure to heat at the time of transfer, metals, ceramics, wood, fabrics and medium with dye acceptability.

EXAMPLES

The present invention will now be described in further detail. However, the present invention is in no way limited by these Examples.

Example 1

On one surface of a polyethylene terephthalate film having a thickness 5 of μm, a coating liquid for forming a protective layer, having the following composition, was coated to a thickness after drying of 1 μm by gravure coating, followed by drying to form a protective layer. The content ratio (acrylic resin/vinyl chloride-vinyl acetate copolymer) of an acrylic copolymer A and a vinyl chloride-vinyl acetate copolymer A was adjusted to 5/5.

<Composition of Coating Liquid for forming Protective Layer>

Acrylic resin A     50 parts
(Mw: 7,000, Tg: 57° C.; trade name: 1FM-1072, manufactured by Taisei Fine Chemical Co., Ltd.; solids content: 50%)

<Composition of Coating Liquid for forming Protective Layer>

| | |
|---|---|
| Vinyl chloride-vinyl acetate copolymer A (Mn: 12,000, Tg: 76° C.; trade name: SOLBIN CNL, manufactured by Nissin Chemical Co., Ltd.) | 25 parts |
| Methyl ethyl ketone | 117 parts |
| Propyl acetate | 50 parts |

Subsequently, on the protective layer formed as described above, a coating liquid for forming an adhesive layer, having the following composition, was coated to a thickness after drying of 1 μm by gravure coating, followed by drying to form an adhesive layer, thereby obtaining a thermal transfer sheet. The adhesive layer in the present Examples also serves as a receiving layer.

<Composition of Coating Liquid for forming Adhesive Layer>

| | |
|---|---|
| Polyester resin (trade name: VYLON 200, manufactured by TOYOBO Co., Ltd.) | 20 parts by mass |
| UV absorber copolymer resin (trade name: UVA-635L, manufactured by BASF Japan Ltd.) | 10 parts by mass |
| Methyl ethyl ketone | 80 parts by mass |

Example 2

A thermal transfer sheet was prepared in the same manner as in Example 1, except that the acrylic resin A was changed to an acrylic resin B (Mw: 30,000, Tg: 75° C.; trade name: BR-113, manufactured by Mitsubishi Rayon Co., Ltd.) in the composition of the coating liquid for forming a protective layer, used in Example 1.

Example 3

A thermal transfer sheet was prepared in the same manner as in Example 1, except that the vinyl chloride-vinyl acetate copolymer A was changed to a vinyl chloride-vinyl acetate copolymer B (Mn: 31,000, Tg: 70° C.; trade name: SOLBIN C, manufactured by Nissin Chemical Co., Ltd.) in the composition of the coating liquid for forming a protective layer, used in Example 1.

Example 4

A thermal transfer sheet was prepared in the same manner as in Example 1, except that the acrylic resin A was changed to the acrylic resin B, and the vinyl chloride-vinyl acetate copolymer A was changed to the vinyl chloride-vinyl acetate copolymer B, in the composition of the coating liquid for forming a protective layer, used in Example 1.

Example 5

A thermal transfer sheet was prepared in the same manner as in Example 1, except that the content ratio (acrylic resin/vinyl chloride-vinyl acetate copolymer) of the acrylic resin A to the vinyl chloride-vinyl acetate copolymer A was adjusted to 3/7, in the composition of the coating liquid for forming a protective layer, used in Example 1.

Example 6

A thermal transfer sheet was prepared in the same manner as in Example 1, except that the content ratio (acrylic resin/vinyl chloride-vinyl acetate copolymer) of the acrylic resin A to the vinyl chloride-vinyl acetate copolymer A was adjusted to 7/3, in the composition of the coating liquid for forming a protective layer, used in Example 1.

Comparative Example 1

A thermal transfer sheet was prepared in the same manner as in Example 1, except that the acrylic resin A was not included in the composition of the coating liquid for forming a protective layer, used in Example 1.

Comparative Example 2

A thermal transfer sheet was prepared in the same manner as in Example 1, except that the vinyl chloride-vinyl acetate copolymer A was not included in the composition of the coating liquid for forming a protective layer, used in Example 1.

Comparative Example 3

A thermal transfer sheet was prepared in the same manner as in Example 1, except that the vinyl chloride-vinyl acetate copolymer A was changed to a polyester resin (trade name: VYLON 200, manufactured by TOYOBO Co., Ltd.) in the composition of the coating liquid for forming a protective layer, used in Example 1.

<Evaluation of Thermal Transfer Sheet>
(Measurement of Peel Force in Non-Heated State)

The transfer layer (the protective layer and the adhesive layer) included in each of the thermal transfer sheets prepared in Examples and Comparative Examples described above was subjected to the measurement of the 180° peel force at a tensile speed of 1,000 mm/min and at a temperature of 40° C., in accordance with JIS-Z-0237 and using a tensile tester (trade name: HEIDON-14DR, manufactured by Shinto Scientific Co., Ltd.) at 40° C. under an atmosphere of 50% relative humidity. More specifically, each of the thermal transfer sheets prepared in Examples and Comparative Examples was fixed on the tensile tester, such that the stage of the tensile tester and the surface of the thermal transfer sheet opposite from the surface provided with the transfer layer face each other. Then an adhesive tape (trade name: Mending Tape MD12C, manufactured by Nichiban Co., Ltd.) was pasted on the transfer layer surface of the transfer sheet, and the transfer layer was peeled off from the thermal transfer sheet. The measured results are shown in Table 1.

(Measurement of Peel Force in Heated State)

In the measurement, a printer was used which includes: a thermal transfer sheet supplying means; a heating means; a thermal transfer sheet winding means; a measuring means located between the heating means and the thermal transfer sheet winding means and configured to measure the tensile strength of a thermal transfer sheet transported along the transport path; and a peeling means located between the heating means and the measuring means. The thermal transfer sheet according to the present invention and a transfer receiving material (DS-40 genuine paper, manufactured by DNP Photo Imaging Japan Co., Ltd.) were layered one on another, and while transferring the transfer layer onto the transfer receiving material under the conditions of a printing power of 0.15 W/dot, a transport speed of the thermal transfer sheet of 84.6 mm/sec and peeling angle 50°, the transfer layer which had been transferred onto the transfer receiving material was peeled off from the substrate; the tensile strength measured by the measuring means at this time was determined. The measured results are shown in Table 1.

(Evaluation of Foil Fall During Printing)

Each of the thermal transfer sheets prepared in Examples and Comparative Examples as described above was cut and pasted on an OP panel of a genuine ribbon for a sublimation transfer printer (DS-40, manufactured by DNP Photo Imaging Japan Co., Ltd.), and the resultant was set in the printer. After allowing the thermal transfer sheet to stand under the environment of 22.5° C. and 50% relative humidity for 1 hour, a gray solid (128/255 gradation) image was formed on a genuine image receiving paper for DS-40. The resulting image of each pattern was observed by visual observation, and the occurrence of foil fall during printing was evaluated according to the following evaluation criteria.

A: No occurrence of foil fall was observed and the resulting printed matter has no defect.

B: Defects due to foil fall were observed in the resulting printed matter.

(Evaluation of Peeling Defects During Printing)

In the combination of each of the thermal transfer sheets prepared in Examples and Comparative Examples as described above and a thermal transfer image receiving sheet, the thermal fusion bonding was evaluated when the transfer layer was transferred onto the thermal transfer image receiving sheet using the above described hot peeling-type test printer, according to the following evaluation criteria.

A: No occurrence of thermal fusion bonding was observed, and the transfer layer can be peeled off from the substrate in a favorable manner.

B: Occurrence of thermal fusion bonding was observed in a portion or the entirety of the transfer layer, and the portion or the entirety of the transfer layer cannot be peeled off from the substrate.

TABLE 1

| | Composition of protective layer | | | | | Peel force in a non-heated state (N/m) | Peel force in a heated state (N/m) | Evaluation of foil fall | Evaluation of peeling defects |
|---|---|---|---|---|---|---|---|---|---|
| | (Meth)acrylic resin | | Vinyl chloride-vinyl acetate copolymer | | Content ratio | | | | |
| | Mw | Tg (° C.) | Mn | Tg (° C.) | | | | | |
| Example 1 | 7,000 | 57 | 12,000 | 76 | 5/5 | 12 | 2.8 | A | A |
| Example 2 | 30,000 | 75 | 12,000 | 76 | 5/5 | 9.8 | 6.1 | A | A |
| Example 3 | 7,000 | 57 | 31,000 | 70 | 5/5 | 11.3 | 2.5 | A | A |
| Example 4 | 30,000 | 75 | 31,000 | 70 | 5/5 | 9.6 | 6.5 | A | A |
| Example 5 | 7,000 | 57 | 12,000 | 76 | 3/7 | 24.5 | 9.3 | A | A |
| Example 6 | 7,000 | 57 | 12,000 | 76 | 7/3 | 1.5 | 1.4 | A | A |
| Comparative Example 1 | — | — | 12,000 | 76 | — | 85 | 78.4 | A | B |
| Comparative Example 2 | 7,000 | 57 | — | — | — | 0.2 | 0.5 | B | A |
| Comparative Example 3 | 7,000 | 57 | A polyester resin was used | | — | 3.7 | 25.1 | A | B |

DESCRIPTION OF SYMBOLS 1 thermal transfer sheet
10 substrate
20 protective layer
30 adhesive layer
40 transfer layer
50 release layer
60 primer layer

The invention claimed is:

1. A thermal transfer sheet comprising:
at least a substrate and a transfer layer;
wherein the transfer layer comprises at least a protective layer adapted to be peelable from the substrate;
wherein the protective layer comprises a (meth)acrylic resin having a glass transition temperature (Tg) of 60° C. or lower and a vinyl chloride-vinyl acetate copolymer, whereby the transfer layer has a peel force in a non-heated state of 1 N/m or more and a peel force in a heated state of 10 N/m or less; and
wherein the (meth)acrylic resin is (1) an alkyl acrylate polymer or an alkyl methacrylate polymer, (2) a copolymer of alkyl acrylate and alkyl methacrylate, (3) a copolymer of alkyl acrylate and at least one other monomer selected from the group consisting of styrene, benzylstyrene, phenoxyethyl methacrylate, acrylamide and methacrylamide, or (4) a copolymer of alkyl methacrylate and at least one other monomer selected from the group consisting of styrene, benzylstyrene, phenoxyethyl methacrylate, acrylamide and methacrylamide.

2. The thermal transfer sheet according to claim 1, wherein a content ratio ((meth)acrylic resin/vinyl chloride-vinyl acetate copolymer) of the (meth)acrylic resin having a glass transition temperature (Tg) of 60° C. or lower to the vinyl chloride-vinyl acetate copolymer in the protective layer is 3/7 or more and 7/3 or less, on mass basis.

* * * * *